United States Patent
Onishi et al.

(10) Patent No.: US 12,223,746 B2
(45) Date of Patent: Feb. 11, 2025

(54) DISTRACTED-DRIVING MONITORING APPARATUS FOR VEHICLE

(71) Applicant: SUBARU CORPORATION, Tokyo (JP)

(72) Inventors: Keita Onishi, Tokyo (JP); Masayuki Marubashi, Tokyo (JP); Junpei Tokizaki, Tokyo (JP); Keiji Asai, Tokyo (JP); Shinichi Miyamoto, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 421 days.

(21) Appl. No.: 17/702,437

(22) Filed: Mar. 23, 2022

(65) Prior Publication Data

US 2022/0319203 A1    Oct. 6, 2022

(30) Foreign Application Priority Data

Mar. 31, 2021  (JP) .................. 2021-060230

(51) Int. Cl.
*G06V 20/59* (2022.01)
*B60W 40/09* (2012.01)
(Continued)

(52) U.S. Cl.
CPC ........... *G06V 20/597* (2022.01); *B60W 40/09* (2013.01); *B60W 40/11* (2013.01); *B60W 40/114* (2013.01); *G06V 40/174* (2022.01); *B60W 2040/0881* (2013.01); *B60W 2420/403* (2013.01); *B60W 2540/01* (2020.02); *B60W 2540/229* (2020.02)

(58) Field of Classification Search
None
See application file for complete search history.

(56) References Cited

U.S. PATENT DOCUMENTS

2021/0390322 A1* 12/2021 Hara .................. G06V 40/165

FOREIGN PATENT DOCUMENTS

| JP | 2018-013811 A | 1/2018 |
|----|---------------|--------|
| JP | 2018-108784 A | 7/2018 |

(Continued)

OTHER PUBLICATIONS

Notice of Reasons for Refusal received in corresponding Japanese Patent Application No. 2021-060230, dated Oct. 8, 2024.

*Primary Examiner* — Lennin R Rodriguezgonzalez
(74) *Attorney, Agent, or Firm* — Rimon P.C.

(57) ABSTRACT

A distracted-driving monitoring apparatus for a vehicle includes an imaging device and a determiner. The imaging device is configured to capture an image indicating at least an occupant of the vehicle. The determiner is configured to make a determination on distracted driving of the occupant of the vehicle based on the captured image. The determiner is configured to determine areas in the captured image corresponding to areas that the occupant faces from among divided areas obtained by dividing a viewing range. The viewing range corresponds to a range where the occupant is likely to face while the vehicle is in operation. The determiner is configured to execute determination processing differently for each of the determined areas to make the determination on the distracted driving of the occupant.

7 Claims, 10 Drawing Sheets

(51) Int. Cl.
    *B60W 40/11*           (2012.01)
    *B60W 40/114*        (2012.01)
    *G06V 40/16*         (2022.01)
    *B60W 40/08*         (2012.01)

(56) References Cited

FOREIGN PATENT DOCUMENTS

| | | |
|---|---|---|
| JP | 2019-101520 A | 6/2019 |
| JP | 2020-077220 A | 5/2020 |

\* cited by examiner

FR AREA
(FACE DIRECTION)

FF AREA
(FACE DIRECTION AND
EYE DIRECTION)

FC AREA
(FACE DIRECTION)

FS AREA
(FACE DIRECTION AND
EYE DIRECTION)

FL AREA
(FACE DIRECTION)

DISTRACTED-DRIVING MONITORING APPARATUS FOR VEHICLE

The present application claims priority from Japanese Patent Application No. 2021-060230 filed on Mar. 31, 2021, the entire contents of which are hereby incorporated by reference.

BACKGROUND

The disclosure relates to a distracted-driving monitoring apparatus for a vehicle.

Japanese Unexamined Patent Application Publication Nos. 2018-108784 and 2020-077220 each disclose a distracted-driving monitoring apparatus for a vehicle, which makes a determination on distracted driving of an occupant of the vehicle, such as a driver.

SUMMARY

An aspect of the disclosure provides a distracted-driving monitoring apparatus for a vehicle. The distracted-driving monitoring apparatus includes an imaging device and a determiner. The imaging device is configured to capture an image indicating at least an occupant of the vehicle. The determiner is configured to make a determination on distracted driving of the occupant of the vehicle based on the captured image. The determiner is configured to determine areas in the captured image corresponding to areas that the occupant faces from among divided areas obtained by dividing a viewing range. The viewing range corresponds to a range where the occupant is likely to face while the vehicle is in operation. The determiner is configured to execute determination processing differently for each of the determined areas to make the determination on the distracted driving of the occupant.

An aspect of the disclosure provides a distracted-driving monitoring apparatus for a vehicle. The distracted-driving monitoring apparatus includes an imaging device and circuitry. The imaging device is configured to capture an image indicating at least an occupant of the vehicle. The circuitry is configured to make a determination on distracted driving of the occupant of the vehicle based on the captured image. The circuitry is configured to determine areas in the captured image corresponding to areas that the occupant faces from among divided areas obtained by dividing a viewing range. The viewing range corresponds to a range where the occupant is likely to face while the vehicle is in operation. The circuitry is configured to execute determination processing differently for each of the determined areas to make the determination on the distracted driving of the occupant.

BRIEF DESCRIPTION OF THE DRAWINGS

The accompanying drawings are included to provide a further understanding of the disclosure and are incorporated in and constitute a part of this specification. The drawings illustrate an example embodiment and, together with the specification, serve to explain the principles of the disclosure.

DETAILED DESCRIPTION

When making a determination on distracted driving of an occupant of a vehicle, such as a driver, a determination is made basically based on the direction of the occupant's face. However, the eye direction of the occupant may not be the same as the face direction. For example, while the occupant is facing the front side, that is, the traveling direction of the vehicle, he/she may look at a different direction, such as the inside of the vehicle.

To enhance the accuracy of determination on distracted driving of an occupant of a vehicle, such as a driver, it may be desirable to use the eye direction as well as the face direction. Nevertheless, an image taken by an imaging device is not necessarily captured at an angle from which distracted driving can be determined. For example, if an occupant turns the face in the opposite direction from the imaging device, a captured image does not include the eyeballs of the occupant. If a determination on distracted driving is made by using the face direction and the eye direction based on such an image, the eye direction is wrongly determined, and a correct determination result may not be obtained.

It is thus desirable to enhance the accuracy of determination on distracted driving of an occupant of a vehicle, such as a driver.

In the following, an embodiment of the disclosure is described in detail with reference to the accompanying drawings. Note that the following description is directed to an illustrative example of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following embodiment which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description.

Figure 1:
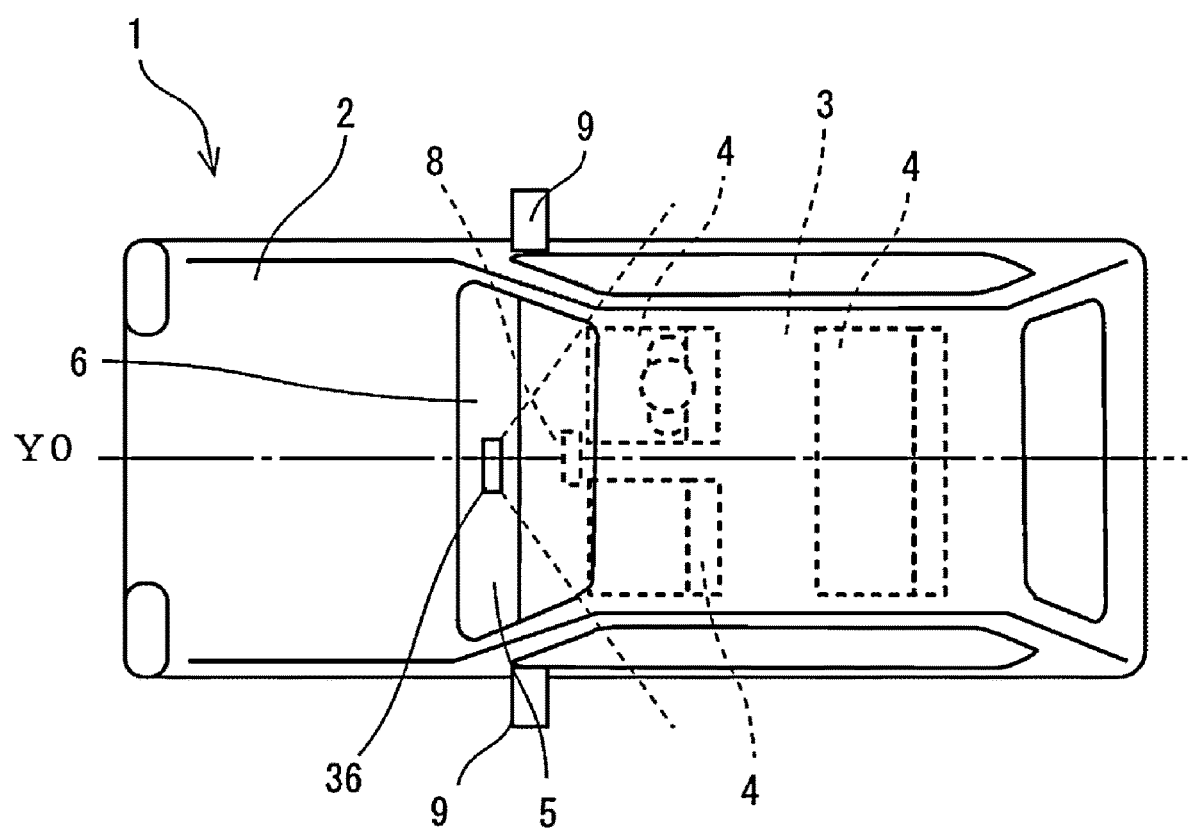
FIG. 1 is a schematic plan view of an automobile using a distracted-driving monitoring apparatus of an embodiment of the disclosure.

FIG. 1 is a schematic plan view of an automobile 1 using a distracted-driving monitoring apparatus of the embodiment.

Figure 2:
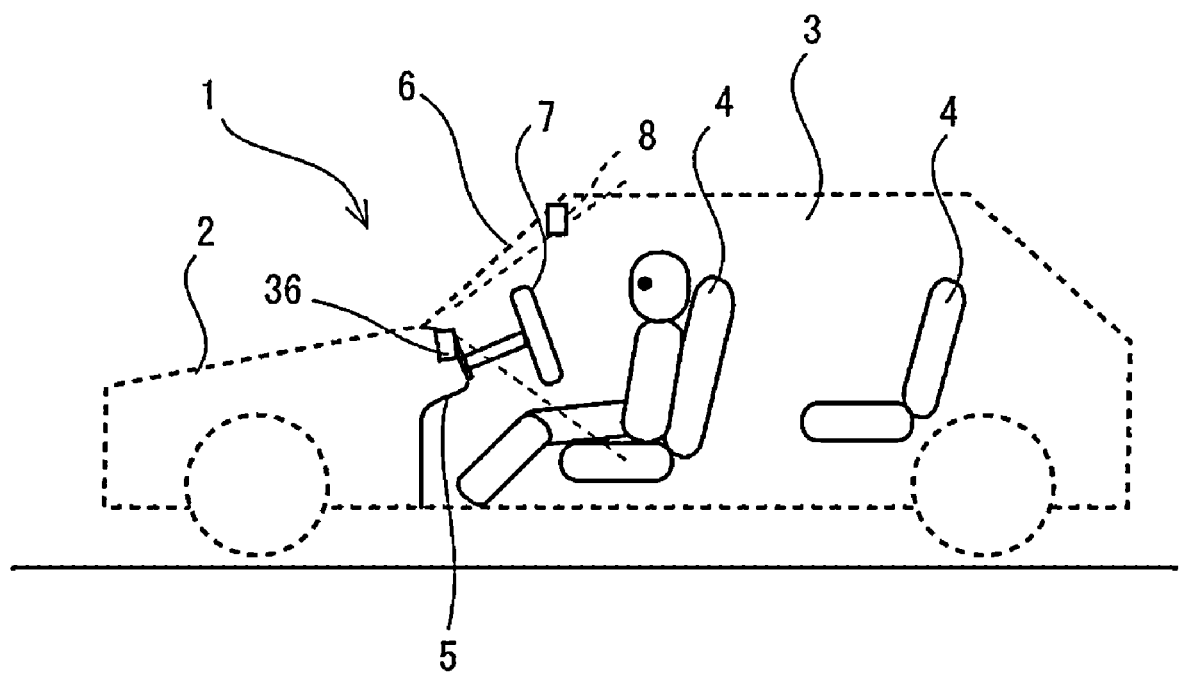
FIG. 2 is a schematic vertical sectional view of the automobile illustrated in FIG. 1.

FIG. 2 is a schematic vertical sectional view of the automobile 1 illustrated in FIG. 1.

The automobile 1 is an example of a vehicle.

The automobile 1 illustrated in FIGS. 1 and 2 includes a body 2. A compartment 3 is provided in the body 2. Inside the compartment 3, plural rows of seats 4 where a driver and passengers can sit are disposed. Inside the compartment 3, a dashboard 5 is provided in front of the seats 4 in the front row. The dashboard 5 extends in the left-right direction of the body 2 of the automobile 1. A steering wheel 7 and an in-vehicle camera 36 of a driver/passenger monitoring unit 11, which will be discussed later, are provided on the dashboard 5. On the front side of the compartment 3, a windshield 6 is provided above the dashboard 5.

The in-vehicle camera 36 is located at the central portion of the dashboard 5 in the left-right direction.

The steering wheel 7 is provided on the left-side portion of the dashboard 5 so as to be located in front of the driver's seat 4.

A rear view mirror 8 is disposed at the central portion of the body 2 in the left-right direction.

The driver drives the automobile 1 by operating the steering wheel 7, an accelerator pedal, a brake pedal, and a select lever of transmission.

Figure 3:
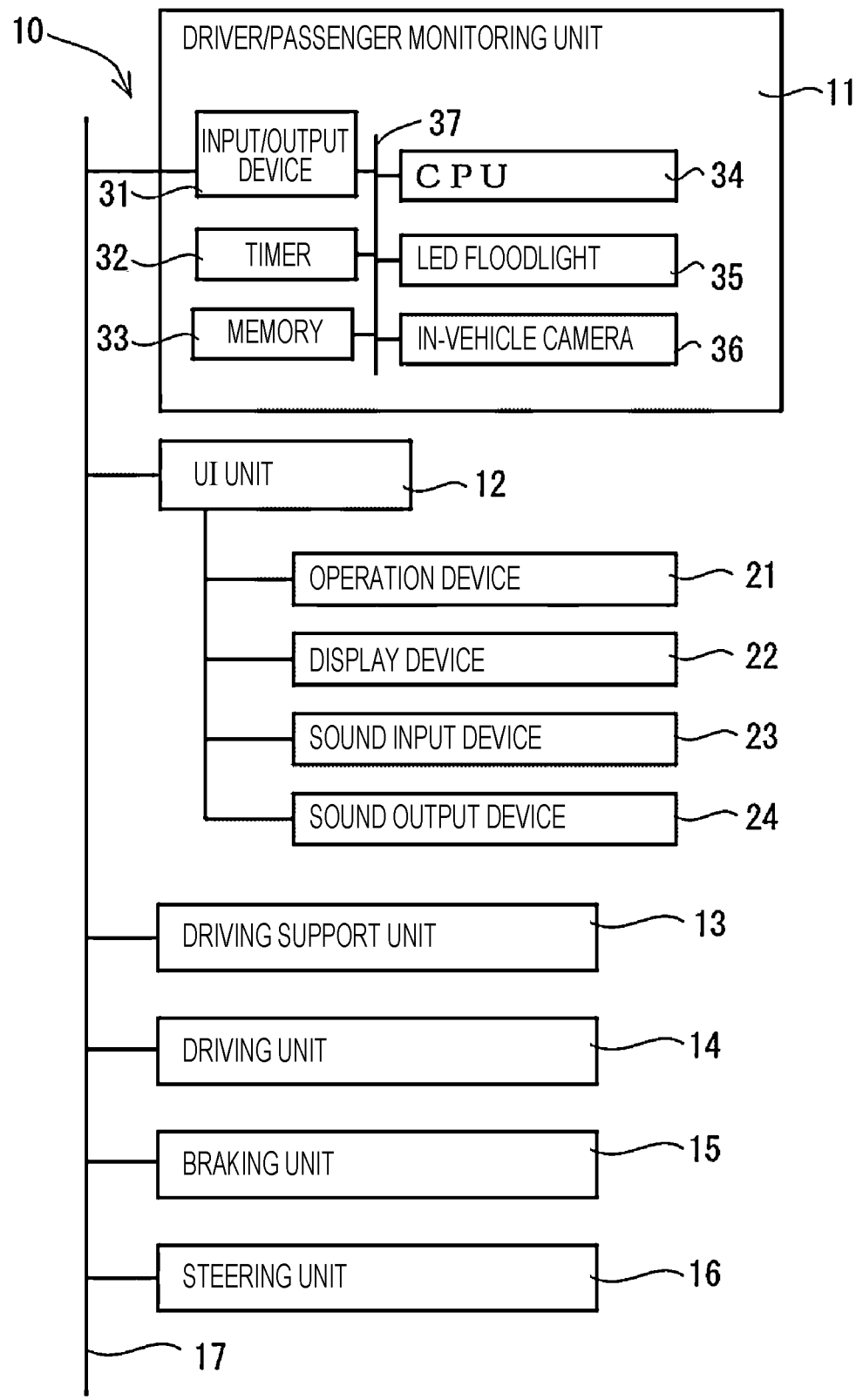
FIG. 3 is a block diagram of a control system which functions as the distracted-driving monitoring apparatus in the automobile illustrated in FIG. 1.

FIG. 3 is a block diagram of a control system 10 which functions as a distracted-driving monitoring apparatus in the automobile 1 illustrated in FIG. 1.

The control system 10 includes a driver/passenger monitoring unit 11, a user interface (UI) unit 12, a driving support unit 13, a driving unit 14, a braking unit 15, a steering unit 16, and an in-vehicle network 17 to which these elements are coupled.

The in-vehicle network 17 may be a wired communication network, such as a controller area network (CAN) or a local interconnect network (LIN). The in-vehicle network 17 may be a communication network, such as a local area network (LAN), or a combination of a LAN and the above-described networks. The in-vehicle network 17 may partially include a wireless communication network. The driver/passenger monitoring unit 11, the UI unit 12, the driving support unit 13, the driving unit 14, the braking unit 15, and the steering unit 16 send and receive data with each other via the in-vehicle network 17. Data may be encrypted and then sent and received via the in-vehicle network 17 as packet data appended with the ID of a sending unit and the ID of a destination unit.

The driving unit 14 includes a power source, for example, and generates driving force for accelerating the automobile 1. The driving unit 14 generates driving force by utilizing an internal combustion engine in which the combustion of a fuel such as gasoline or ethanol occurs, an electric motor using stored electricity, a power source using hydrogen, or a hybrid power source using a combination of these power sources. The driving unit 14 may generate driving force based on the amount by which the accelerator pedal is stepped on.

The braking unit 15 includes brakes, for example, and generates braking force for causing the automobile 1 to decelerate and stop. The braking unit 15 may generate braking force based on the amount by which the brake pedal is stepped on.

The steering unit 16 includes a steering mechanism, for example, and changes the traveling direction of the automobile 1. The steering unit 16 may change the traveling direction of the automobile 1 based on the amount by which the steering wheel 7 is operated.

The driving support unit 13 supports a driver in driving so as to control the driving of the automobile 1. The driving support unit 13 outputs a control instruction based on the operation amount of the driver or based on the adjusted amount of the operation amount of the driver to the driving unit 14, the braking unit 15, and the steering unit 16. The driving support unit 13 may output a control instruction based on autonomous driving, that is, when the operation amount of the driver is zero, to the driving unit 14, the braking unit 15, and the steering unit 16.

The UI unit 12 serves as an interface with an occupant of the automobile 1, such as a driver. UI devices, such as an operation device 21, a display device 22, a sound input device 23, and a sound output device 24, are coupled to the UI unit 12.

The display device 22 is a liquid crystal display, for example, and may be disposed at the central portion of the dashboard 5 in the left-right direction or at a position in front of a driver.

The operation device 21 may be a touchscreen placed on top of the display screen of a liquid crystal display, for example. The operation device 21 may be various buttons and switches.

The sound input device 23 is a microphone, for example.

The sound output device 24 is a speaker, for example.

The UI unit 12 may output information, which is obtained from the driver/passenger monitoring unit 11, the driving support unit 13, the driving unit 14, the braking unit 15, and the steering unit 16, from the display device 22 or the sound output device 24.

In response to an operation performed on the operation device 21 or a sound instruction input into the sound input device 23, the UI unit 12 generates corresponding information and outputs it to the driver/passenger monitoring unit 11, the driving support unit 13, the driving unit 14, the braking unit 15, and the steering unit 16.

The driver/passenger monitoring unit 11 identifies and monitors a driver and passengers sitting in the seats 4 in the compartment 3 of the automobile 1. For the sake of safety, during driving, the driver and passengers are supposed to pay attention to the environments around the automobile 1. However, they may sometimes look away from the traveling direction of the automobile 1 or fall asleep, especially during autonomous driving, or they may even have a seizure. The driver/passenger monitoring unit 11 monitors such a situation and causes the control system 10 (driving support unit 13, for example) to handle such a situation.

The driver/passenger monitoring unit 11 includes an input/output device 31, a timer 32, a memory 33, a central processing unit (CPU) 34, a light-emitting diode (LED) floodlight 35, the in-vehicle camera 36, and a system bus 37 to which these elements are coupled.

As in the driver/passenger monitoring unit 11, the UI unit 12, the driving support unit 13, the driving unit 14, the braking unit 15, and the steering unit 16, may also include an input/output device, a timer, a memory, a CPU, and a system bus to which these elements are coupled.

As illustrated in FIGS. 1 and 2, the in-vehicle camera 36 is disposed at the central portion of the dashboard 5 in the left-right direction so as to capture an image of the compartment 3 farther backward. The in-vehicle camera 36 can capture an image of the compartment 3 including the driver and passengers in the compartment 3. In one embodiment, the in-vehicle camera 36 may serve as an "imaging device".

The LED floodlight 35 applies infrared light, for example, to the driver and passengers, when an image is taken by the in-vehicle camera 36. The LED floodlight 35 may be disposed at the central portion of the dashboard 5 next to the in-vehicle camera 36.

The input/output device 31 is coupled to the in-vehicle network 17. The input/output device 31 inputs and outputs data with the UI unit 12, the driving support unit 13, the driving unit 14, the braking unit 15, and the steering unit 16 via the in-vehicle network 17.

The timer 32 measures various times including the clock time.

The memory 33 stores a program to be executed by the CPU 34 and various items of data. The memory 33 may be a non-volatile memory, a volatile memory, or a combination thereof. Examples of the non-volatile memory are a hard disk drive and a semiconductor memory having a data retaining function, such as an electrically erasable programmable read-only memory (EEPROM) and a solid state drive (SSD). An example of the volatile memory is a semiconductor memory, such as a random access memory (RAM).

The CPU 34 reads and executes a program stored in the memory and thus serves as a controller of the driver/passenger monitoring unit 11.

The CPU 34 controls the image-capturing of the in-vehicle camera 36 and the floodlighting of the LED floodlight 35.

The CPU 34 identifies and monitors the driver and passengers in the compartment 3, based on the image captured by the in-vehicle camera 36, for example.

If the CPU 34 determines that the driver is looking away from the traveling direction or is falling asleep, based on the image captured by the in-vehicle camera 36, it outputs an alert to the driver and, if such a situation does not change, it instructs the driving support unit 13 to cause the automobile 1 to decelerate and stop at the shoulder of a road, for example.

Figure 4:
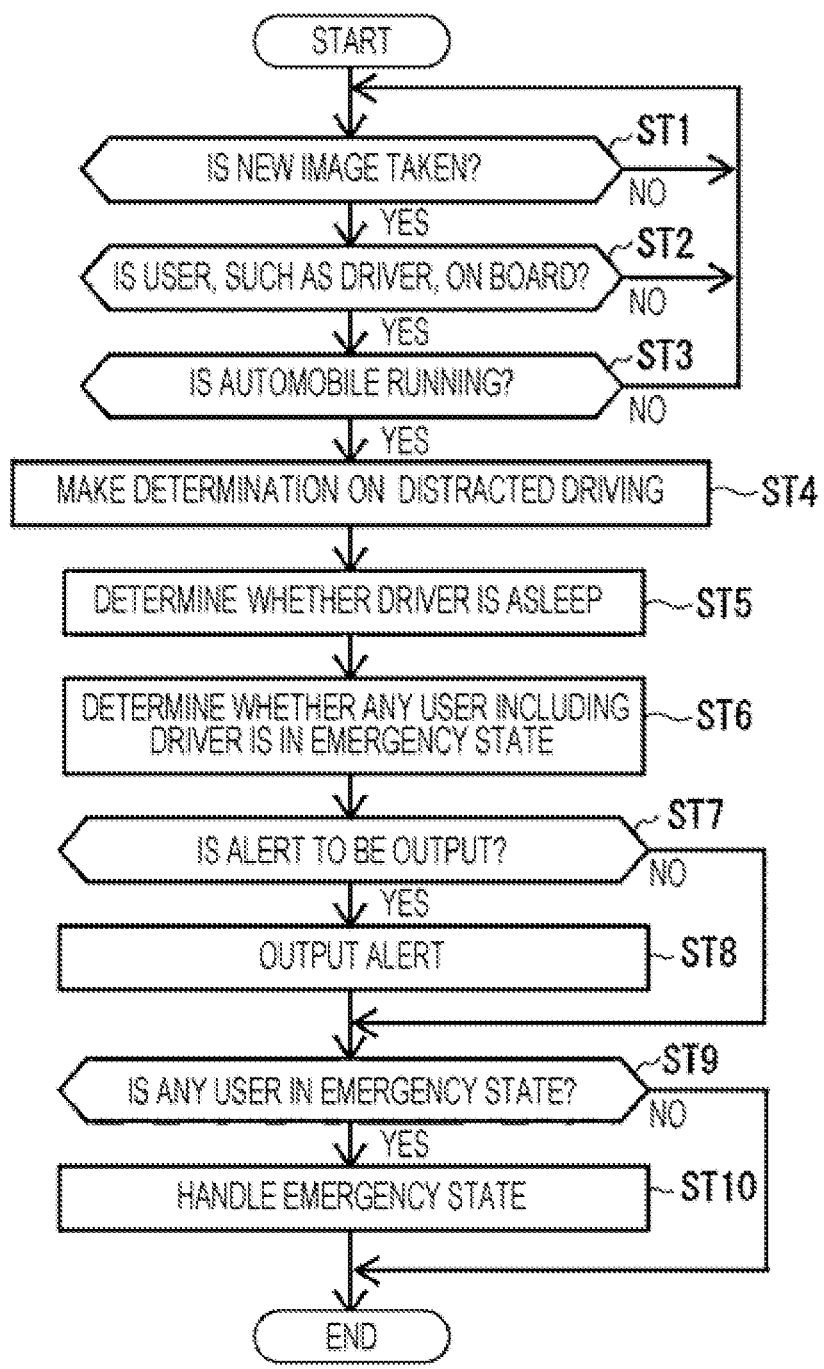
FIG. 4 is a flowchart illustrating driver/passenger monitoring control processing executed by a central processing unit (CPU) of a driver/passenger monitoring unit illustrated in FIG. 3.

FIG. 4 is a flowchart illustrating driver/passenger monitoring control processing executed by the CPU 34 of the driver/passenger monitoring unit 11.

The CPU 34 repeatedly executes driver/passenger monitoring control processing in FIG. 4.

In step ST1, the CPU 34 determines whether a new image is taken by the in-vehicle camera 36. The in-vehicle camera 36 captures images of the compartment 3 on a regular basis. If a new image is not taken by the in-vehicle camera 36, the CPU 34 repeats step ST1. If a new image is taken by the in-vehicle camera 36, the CPU 34 proceeds to step ST2.

In step ST2, the CPU 34 determines whether an occupant, such as a driver, is on board, based on the new image. For example, the CPU 34 may compare the new image with a past image and determine whether there is any difference between the two images. The CPU 34 may then determine whether an occupant, such as a driver, is on board, based on face pattern recognition performed on the different portion of the two images. If no occupant is on board, the CPU 34 returns to step ST1. If the CPU 34 determines that an occupant, such as a driver, is on board, it proceeds to step ST3.

In step ST3, the CPU 34 determines whether the automobile 1 is running.

The CPU 34 may make this determination, based on values detected by a velocity sensor, an acceleration sensor, and a global positioning system (GPS) receiver (none of them are illustrated) provided in the automobile 1. If the automobile 1 is not running, the CPU 34 returns to step ST1. If the automobile 1 is running, the CPU 34 proceeds to step ST4.

In step ST4, the CPU 34 makes a determination on distracted driving of the driver, based on the new image. The CPU 34 may also make this determination for an occupant other than the driver.

In step ST5, the CPU 34 determines whether the driver is asleep, based on the new image. The CPU 34 may also make this determination for an occupant other than the driver.

In step ST6, the CPU 34 determines whether any occupant including the driver is in an emergency state, based on the new image. It is possible that the driver and passengers have a heart attack or a stroke while the automobile 1 is running. If the image captured by the in-vehicle camera 36 contains infrared components, these components in the image indicate information on the blood flow of each occupant. The CPU 34 may determine whether the pulse rate determined from the blood flow is within a normal range. The CPU 34 may determine the emergency state from the driving posture of the driver in the captured image. For example, if the driver's head in the image is down, the CPU 34 may determine that the driver is in an emergency state.

In step ST7, the CPU 34 determines whether to output an alert. If the driver is found to be looking away from the traveling direction or being asleep or an occupant including the driver is found to be in an emergency state, the CPU 34 determines that it is appropriate to output an alert and proceeds to step ST8. If none of the above-described situations is found, the CPU 34 skips step ST8 and proceeds to step ST9.

In step ST8, the CPU 34 outputs an alert to occupants including the driver. For example, the CPU 34 outputs an alert to the UI unit 12. The UI unit 12 outputs the alert to the display device 22 and the sound output device 24. This attracts the attention of occupants including the driver. For example, the driver can turn the eyes back to the traveling direction or stop dozing so as to return to a suitable state for driving. Occupants including the driver can recognize that another occupant is an emergency state and take certain measures to rescue this occupant.

In step ST9, the CPU 34 determines whether any occupant including the driver is in an emergency state. If it is already found in step ST6 that any occupant including the driver is an emergency state and if the driver has not yet returned to a suitable state for driving even after an alert is output in step ST8, the CPU 34 determines that an emergency state is found and proceeds to step ST10. If no emergency state is found in step ST9, the CPU 34 skips step ST10 and completes the control processing.

In step ST10, the CPU 34 executes processing for handling the emergency state. For example, the CPU 34 instructs the driving support unit 13 to bring the automobile 1 to an emergency stop. In response to this instruction, the driving support unit 13 executes autonomous driving control to cause the automobile 1 to decelerate and stop in a driving lane or at the shoulder of the driving lane. The CPU 34 also instructs a wireless device (not illustrated) of the automobile 1 to make an emergency call. The wireless device makes an emergency call to a server of an emergency response organization via a base station, for example, by performing predetermined wireless communication. Then, a rescue team, for example, can hurry to the location where the automobile 1 stops.

When the CPU 34 makes a determination on distracted driving of an occupant of a vehicle, such as the driver, based on a captured image, it can determine basically based on the direction of the occupant's face. However, the eye direction of the occupant may not be the same as the face direction. For example, while the occupant is facing the front side, that is, the traveling direction of the automobile 1, he/she may look aside from the traveling direction.

To enhance the accuracy of determination on distracted driving of an occupant, such as a driver, it may be desirable to use an eye direction as well as the face direction. Nevertheless, an image taken by the in-vehicle camera 36 is not necessarily captured at an angle from which distracted driving can be determined highly accurately. For example, if the occupant turns the face in the opposite direction from the in-vehicle camera 36, a captured image does not include the eyeballs of the driver. If distracted driving determination processing is executed by using the face direction and the eye direction based on such an image, the eye direction may be wrongly determined, and a correct determination result may not be obtained.

It is thus desirable to enhance the accuracy of determination on distracted driving of an occupant of the automobile 1, such as a driver.

Figure 5:
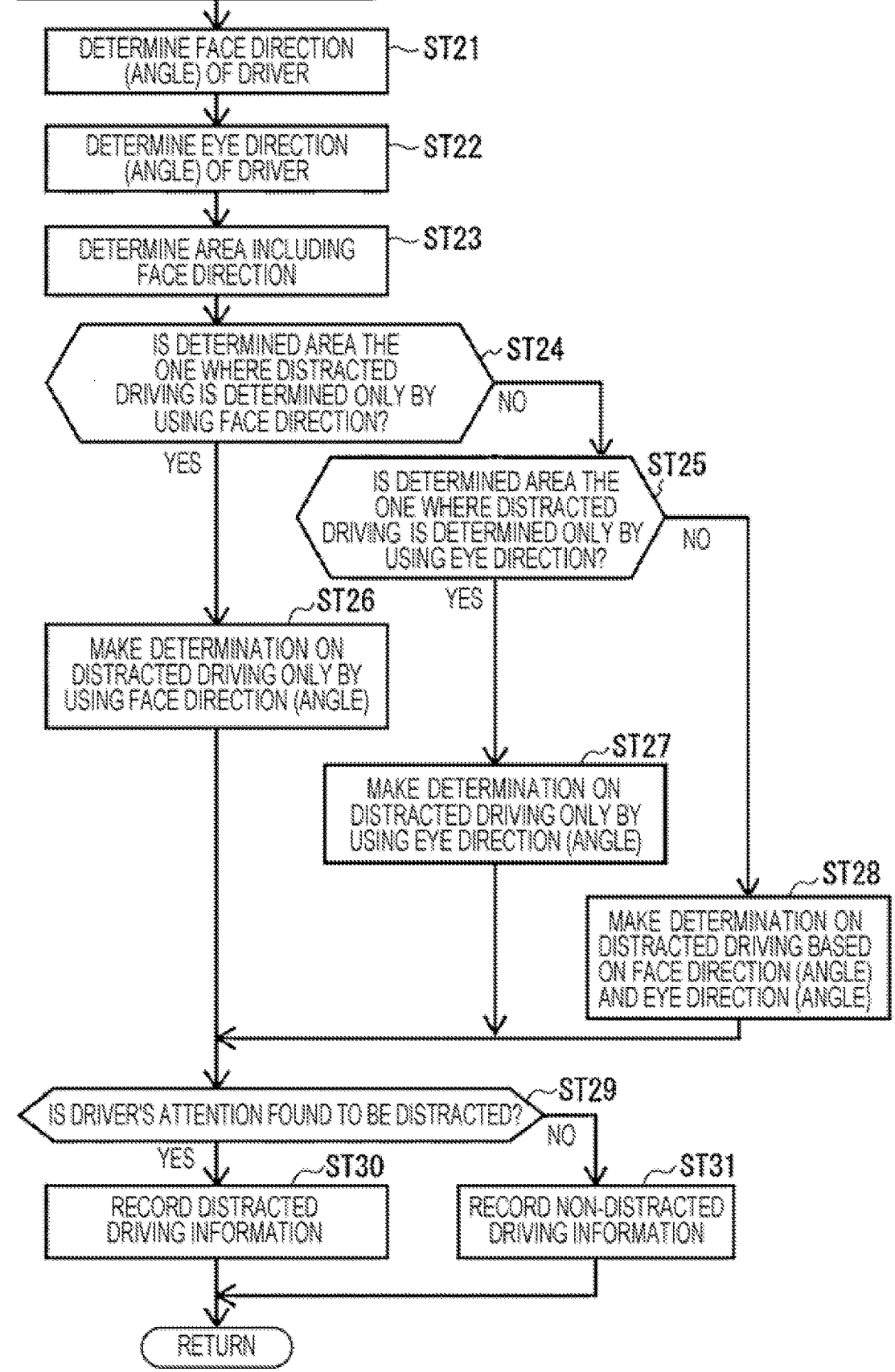
FIG. 5 is a flowchart illustrating the details of distracted driving determination processing in step ST4 in FIG. 4.

FIG. 5 is a flowchart illustrating the details of distracted driving determination processing in step ST4 in FIG. 4.

The CPU 34 of the driver/passenger monitoring unit 11 repeatedly executes distracted driving determination processing in FIG. 5 in the driver/passenger monitoring control processing in FIG. 4.

In step ST21, the CPU 34 determines the face direction (angle) of the driver based on an image of the driver's face included in the captured image. When the direction of the driver's face changes, the image of the driver's face included in the captured image also changes. The CPU 34 may determine the face direction (angle) of the driver by analyzing the state of the image of the driver's face included in the captured image. The CPU 34 may use the direction in which the driver faces straight ahead of the automobile 1 as a reference direction and determine the angle of the face direction of the driver based on this reference direction.

In step ST22, the CPU 34 determines the eye direction (angle) of the driver, based on an image of the driver's eyeballs included in the captured image. When the direction of the driver's face or that of the driver's eyeballs changes, the image of the driver's eyeballs included in the captured image also changes. The CPU 34 may determine the eye direction (angle) of the driver by analyzing the state of the image of the driver's eyeballs included in the captured image. The CPU 34 may use the direction in which the driver faces straight ahead of the automobile 1 as a reference direction and determine the angle of the eye direction based on this reference direction.

A driver viewing range where a driver sitting in the seat 4 may turn the face during driving is divided into multiple areas. In step ST23, the CPU 34 determines the area including the face direction of the driver in the captured image from among the multiple areas obtained by dividing the driver viewing range. Basically, the driver viewing range where a driver sitting in the seat 4 may turn the face is a range in front of the seat 4. The driver viewing range is divided at least into a front area and a peripheral area. The front area is an area in the traveling direction of the automobile 1 to which the driver may turn the eyes while the automobile 1 is running. The peripheral area is an area around the front area. In this case, the CPU 34 determines whether the face direction of the driver is included in the front area and can thereby determine the area including the face direction of the driver in the captured image.

When determining the area including the face direction of the driver in step ST23, the CPU 34 may also determine the area including the eye direction of the driver. The CPU 34 may determine the area including the direction in which the face direction and the eye direction of the driver are combined with each other.

In step ST24, the CPU 34 determines whether the area including the face direction is an area where distracted driving is determined only by using the face direction. If the area including the face direction is not an area where distracted driving is determined only by using the face direction, the CPU 34 proceeds to step ST25. If the area including the face direction is an area where distracted driving is determined only by using the face direction, the CPU 34 proceeds to step ST26.

In step ST25, the CPU 34 determines whether the area including the face direction is an area where distracted driving is determined only by using the eye direction. If the area including the face direction is not an area where distracted driving is determined only by using the eye direction, the CPU proceeds to step ST28. If the area including the face direction is an area where distracted driving is determined only by using the eye direction, the CPU 34 proceeds to step ST27.

In step ST26, the CPU 34 makes a determination on distracted driving of the driver, based on only the face direction of the driver. Then, the CPU 34 proceeds to step ST29.

In step ST27, the CPU 34 makes a determination on distracted driving of the driver, based on only the eye direction of the driver. Then, the CPU 34 proceeds to step ST29.

In step ST28, the CPU 34 makes a determination on distracted driving of the driver based on the face direction of the driver and also makes a determination based on the eye direction of the driver.

If it is found, based on either one of the determinations, that the driver is looking aside from the traveling direction, the CPU 34 determines that the driver's attention is distracted. If it is found, based on both of the determinations, that the driver is not looking aside from the traveling direction, the CPU 34 determines that the driver's attention is not distracted. The CPU 34 then proceeds to step ST29.

By executing steps ST24 through ST28, the CPU 34 can make a determination on distracted driving of the driver differently in accordance with the determined area in step ST23. For example, instead of executing the same determination processing for all the multiple areas of the driver viewing range, the CPU 34 can execute determination processing differently in accordance with the position of the determined area in the driver viewing range.

In step ST29, the CPU 34 determines whether the driver's attention is found to be distracted. If the driver's attention is found to be distracted, the CPU 34 proceeds to step ST30. If the driver's attention is not found to be distracted, the CPU 34 proceeds to step ST31.

In step ST30, the CPU 34 records distracted driving information indicating that the driver's attention is distracted on the memory 33.

In step ST31, the CPU 34 records non-distracted driving information indicating that the driver's attention is not distracted on the memory 33.

The CPU 34 repeatedly executes the processing in FIG. 5 in step ST4 in FIG. 4. This can store determination results about driver's distracted driving determined from repeatedly captured images in the memory 33.

The CPU 34 can also determine in step ST7 whether to output an alert and determine in step ST9 whether any occupant including the driver is in an emergency state by using the history of the determination results stored in the memory 33.

For example, if districted driving information is recorded as the latest determination result, the CPU 34 can determine in step ST7 that an alert is to be output and output an alert to occupants including the driver in step ST8.

In another example, if districted driving information is continuously recorded as the latest multiple determination results, the CPU 34 can determine that an occupant is in an emergency state in step ST9 and execute processing for handling the emergency state in step ST10.

Multiple areas of the driver viewing range used for the determination in step ST23 will be explained below. In the above-described example, the driver viewing range where the driver sitting in the seat 4 may turn the face is divided into the front area and the peripheral area. The front area is an area in the traveling direction to which the driver may turn the eyes while the automobile 1 is running. The peripheral area is an area around the front area. Alternatively, the driver viewing range may be divided differently. Some examples of multiple areas of the driver viewing range which can be used practically will be discussed below.

Figure 6:
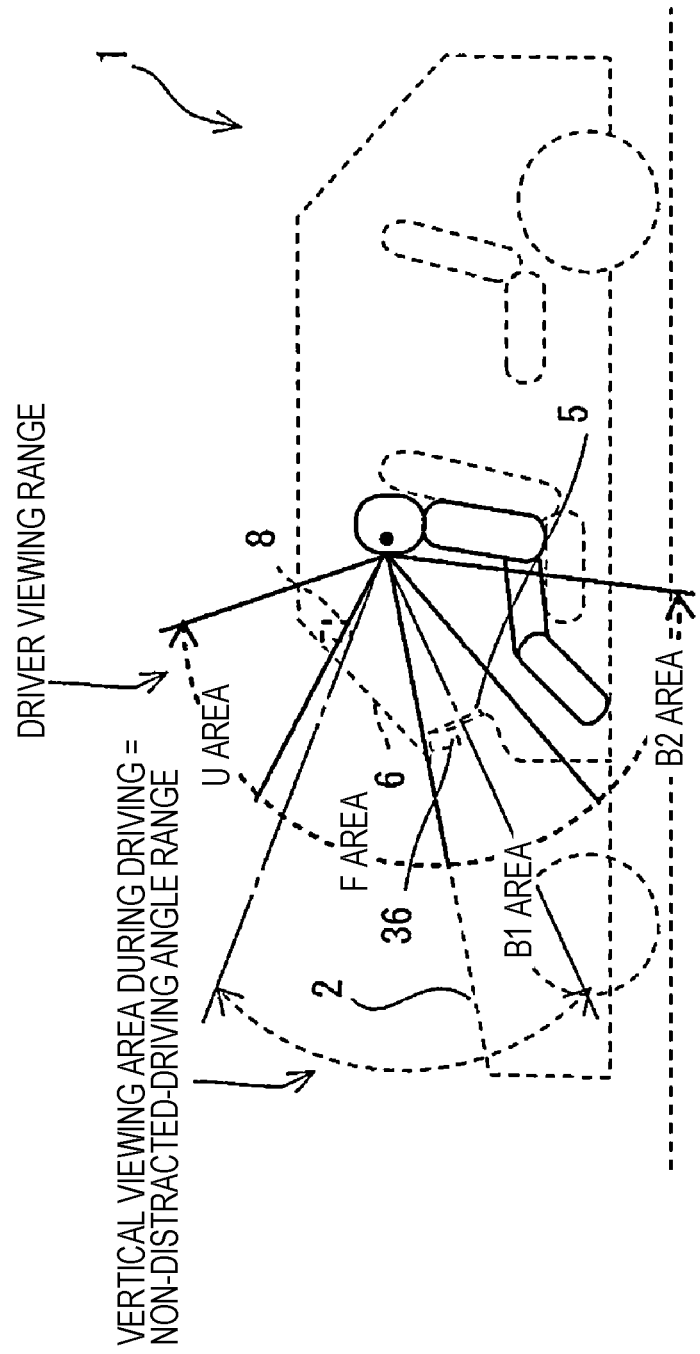
FIG. 6 illustrates examples of multiple areas obtained by dividing a driver viewing range in the top-bottom direction.

FIG. 6 illustrates examples of multiple areas obtained by dividing the driver viewing range in the top-bottom direction.

In FIG. 6, multiple areas obtained by dividing the driver viewing range in the top-bottom direction or the pitch direction of the automobile 1 are illustrated on a schematic vertical sectional view similar to that in FIG. 2. The multiple areas in FIG. 6 are a U area, an F area, a B1 area, and a B2 area.

The F area is a front area where the driver faces and views when the driver checks the traveling direction during driving. The F area may overlap the windshield 6 of the automobile 1.

The U area is a top area above the F area. Basically, the driver does not face and check the U area above the windshield 6 while driving.

The B1 area is a first bottom area below the F area. The B1 area may overlap the dashboard 5. The driver may temporarily look at instruments on the dashboard 5 and the display device 22 to check the driving state of the automobile 1.

The B2 area is a second bottom area below the B1 area. The B2 area may be located under the dashboard 5. Basically, the driver does not face and check the B2 area below the dashboard 5 while driving.

In this manner, the driver viewing range where the driver in the seat 4 may turn the face may be divided into four areas: the U area, F area, B1 area, and B2 area from the top.

Figure 7:
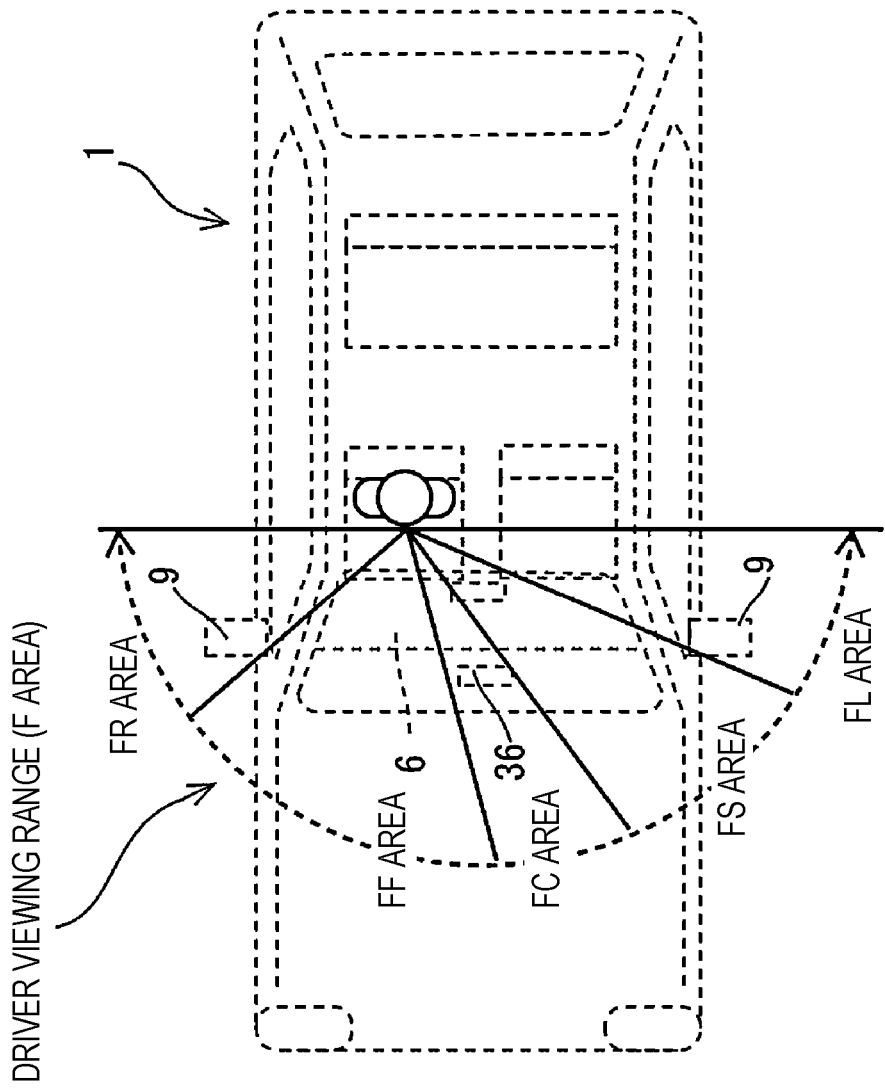
FIG. 7 illustrates examples of multiple areas obtained by dividing the driver viewing range in the left-right direction.

FIG. 7 illustrates examples of multiple areas obtained by dividing the driver viewing range in the left-right direction.

In FIG. 7, multiple areas obtained by dividing the driver viewing range in the left-right direction or the yaw direction of the automobile 1 are illustrated on a schematic plan view similar to that in FIG. 1. The multiple areas in FIG. 7 are an FR area, an FF area, an FC area, an FS area, and an FL area.

The FF area is a front area where the driver faces and views when the driver checks the traveling direction of the automobile 1 during driving. The FF area may be the area corresponding to the substantially right half of the windshield 6 on the side of the steering wheel 7.

The FR area is a right-edge area next to the FF area. Basically, the driver temporarily faces and turns the eyes to the FR area when checking the right side of the automobile 1 or the rear side with a right-side view mirror 9 while driving.

The FC area is a center area left next to the FF area. The FC area may be the area corresponding to the central portion of the windshield 6 of the automobile 1. The driver temporarily faces and turns the eyes to the FC area when checking the dashboard 5 or the rear view mirror 8 while driving.

The FS area is a left-side area next to the FC area. The FS area may be the area corresponding to the substantially left half of the windshield 6. The driver temporarily faces and turns the eyes to the FS area when checking the front left side of the automobile 1 while driving.

The FL area is a left-edge area next to the FS area. Basically, the driver temporarily faces and turns the eyes to the FL area when checking the left side of the automobile 1 or the rear side with a left-side view mirror 9 while driving.

In this manner, the driver viewing range where the driver sitting in the seat 4 may turn the face may be divided into five areas: the FR area, the FF area, the FC area, the FS area, and the FL area from the right.

Figure 8:
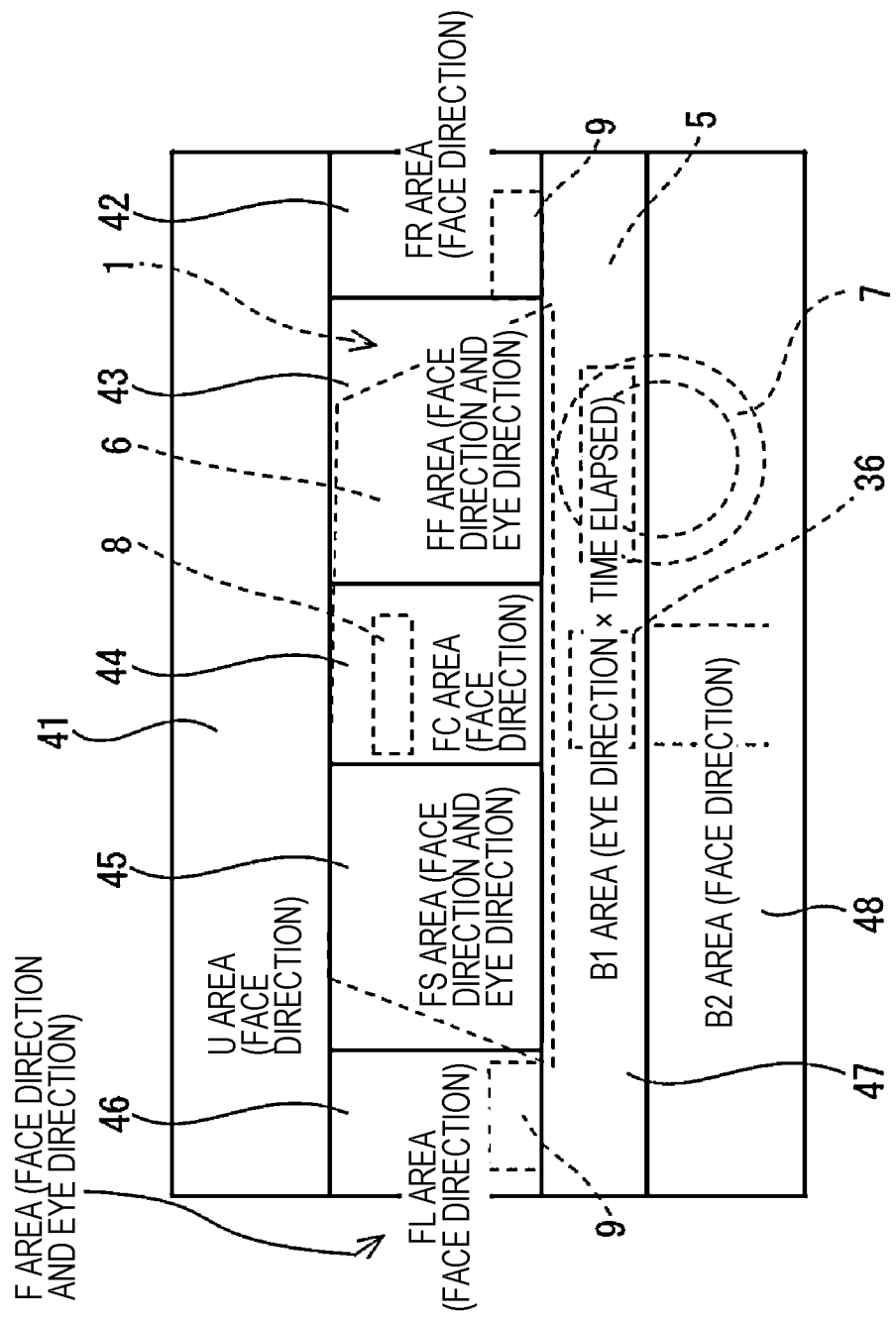
FIG. 8 illustrates examples of multiple areas formed by combining the areas in FIGS. 6 and 7.

FIG. 8 illustrates examples of multiple areas formed by combining the areas in FIGS. 6 and 7.

In FIG. 8, the F area, which is the second area from the top in the vertical direction in FIG. 6, is divided into five areas: an FR area 42, an FF area 43, an FC area 44, an FS area 45, and an FL area 46, in a manner similar to FIG. 7.

As a result, eight areas: a U area 41, FR area 42, FF area 43, FC area 44, FS area 45, FL area 46, B1 area 47, and B2 area 48, are illustrated in FIG. 8.

Three areas: the FF area 43, FC area 44, and FS area 45 overlap the windshield 6. The FR area 42, which is right next to the FF area 43, overlaps the right-side view mirror 9. The FL area 46, which is left next to the FS area 45, overlaps the left-side view mirror 9.

The U area 41 is located above the FR area 42, FF area 43, FC area 44, FS area 45, and FL area 46, while the B1 area 47 is located below the FR area 42, FF area 43, FC area 44, FS area 45, and FL area 46. The B2 area 48 is located below the B1 area 47.

In this manner, the driver viewing range in FIG. 8 is divided into multiple areas in the top-bottom direction or the pitch direction of the automobile 1 and is also divided into multiple areas in the left-right direction or the yaw direction of the automobile 1.

The U area 41 in FIG. 8 is an area where distracted driving of a driver is determined only by using the face direction of the driver without using the eye direction.

The FR area 42 is an area where distracted driving of a driver is determined only by using the face direction of the driver.

The FF area 43 is an area where distracted driving of a driver is determined by using both of the face direction and the eye direction of the driver.

The FC area 44 is an area where distracted driving of a driver is determined only by using the face direction of the driver.

The FS area 45 is an area where distracted driving of a driver is determined by using both of the face direction and the eye direction of the driver.

The FL area 46 is an area where distracted driving of a driver is determined only by using the face direction of the driver.

The B1 area 47 is an area where distracted driving of a driver is determined only by using the eye direction of the driver.

The B2 area 48 is an area where distracted driving of a driver is determined only by using the face direction of the driver.

In this manner, the driver viewing range where the driver sitting in the seat 4 may turn the face are divided into multiple areas: the U area 41, FR area 42, FF area 43, FC area 44, FS area 45, FL area 46, B1 area 47, and B2 area 48.

In step ST23 in FIG. 5, from among the eight areas 41 through illustrated in FIG. 8, the CPU 34 determines the area including the face direction of the driver.

In steps ST24 and ST25 in FIG. 5, the CPU 34 determines whether the area which is found to include the face direction of the driver is an area where distracted driving is determined only by using the face direction, only by using the eye direction, or by using both of the face direction and the eye direction.

If the area including the face direction is the U area 41, the CPU 34 makes a determination on distracted driving of the driver only by using the face direction.

As illustrated in FIG. 6, during driving, the driver basically turns the face and the eyes to a range from the windshield 6 to the dashboard 5 of the automobile 1. This vertical viewing area of the driver during driving is a non-distracted-driving angle range where the driver is not looking away from the traveling direction. If the driver turns the face or the eyes to the top side or the bottom side extending from the non-distracted-driving angle range, the driver is basically considered to be looking away from the traveling direction.

In this case, the CPU 34 may determine whether the face direction of the driver is included in the non-distracted-driving angle range so as to make a determination on distracted driving based on the face direction of the driver.

If the face direction of the driver is included in the non-distracted-driving angle range, the CPU 34 may determine that the driver's attention is not distracted.

If the face direction of the driver is not included in the non-distracted-driving angle range, the CPU 34 may determine that the driver's attention is distracted.

If the area found to include the face direction is the B1 area 47, the CPU 34 makes a determination on distracted driving of the driver only by using the eye direction.

In this case, the CPU 34 may determine whether the eye direction of the driver is included in the non-distracted-driving angle range so as to make a determination on distracted driving of the driver based on the eye direction.

If the eye direction of the driver is not included in the non-distracted-driving angle range, the CPU 34 may determine that the driver's attention is distracted.

If the eye direction of the driver is included in the non-distracted-driving angle range, the CPU 34 may determine that the driver's attention is not distracted.

Even when the eye direction of the driver is included in the non-distracted-driving angle range, if the driver keeps turning the eyes to the direction of the dashboard 5 within a predetermined time that can be measured by the timer 32, the CPU 34 may determine that the driver's attention is distracted. For example, if the driver turns the eyes to the direction of the dashboard 5 continuously three times or more within the predetermined time, the CPU 34 may determine that the driver's attention is distracted.

In one example, the B1 area 47 where distracted driving of a driver is determined only by using the eye direction is provided as at least one of the multiple areas obtained by dividing the driver viewing range in the top-bottom direction or the pitch direction of the automobile 1.

If the area found to include the face direction is the B2 area 48, the CPU 34 makes a determination on distracted driving of the driver only by using the face direction.

In this case, the CPU 34 may determine whether the face direction of the driver is included in the non-distracted-driving angle range so as to make a determination on distracted driving based on the face direction of the driver.

If the face direction of the driver is not included in the non-distracted-driving angle range, the CPU 34 may determine that the driver's attention is distracted.

If the face direction of the driver is included in the non-distracted-driving angle range, the CPU 34 may determine that the driver's attention is not distracted.

FIGS. 9A through 9E are plan views of the automobile 1 for explaining distracted driving determination processing executed differently for individual multiple areas located in the left-right direction in the F area in FIG. 6.

Figure 9A:
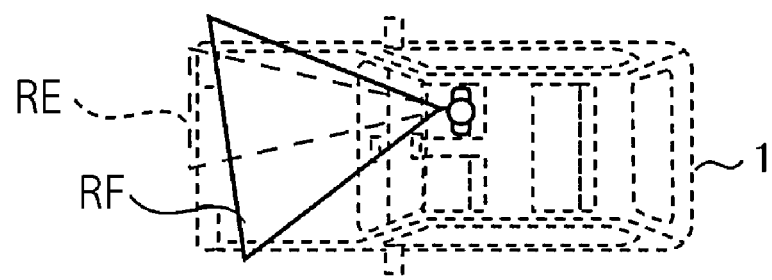
FIG. 9A is a plan view of an automobile for explaining distracted driving determination processing executed when the area including a face direction is found to be an FR area.

FIG. 9A is a plan view of the automobile 1 for explaining distracted driving determination processing executed when the area including the face direction is found to be the FR area 42.

Figure 9B:
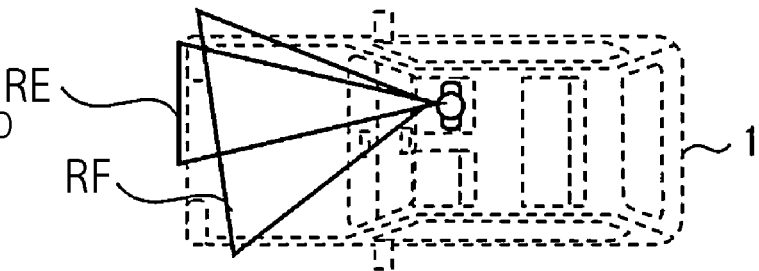
FIG. 9B is a plan view of an automobile for explaining distracted driving determination processing executed when the area including a face direction is found to be an FF area.

FIG. 9B is a plan view of the automobile 1 for explaining distracted driving determination processing executed when the area including the face direction is found to be the FF area 43.

Figure 9C:
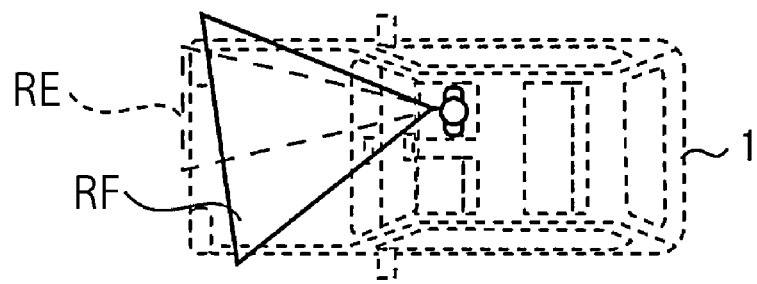
FIG. 9C is a plan view of an automobile for explaining distracted driving determination processing executed when the area including a face direction is found to be an FC area.

FIG. 9C is a plan view of the automobile 1 for explaining distracted driving determination processing executed when the area including the face direction is found to be the FC area 44.

Figure 9D:
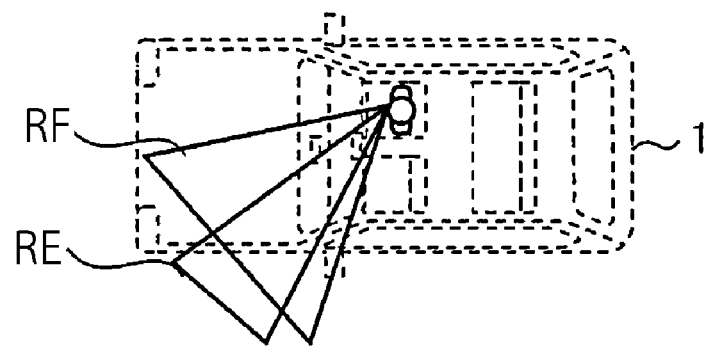
FIG. 9D is a plan view of an automobile for explaining distracted driving determination processing executed when the area including a face direction is found to be an FS area.

FIG. 9D is a plan view of the automobile 1 for explaining distracted driving determination processing executed when the area including the face direction is found to be the FS area 45.

Figure 9E:
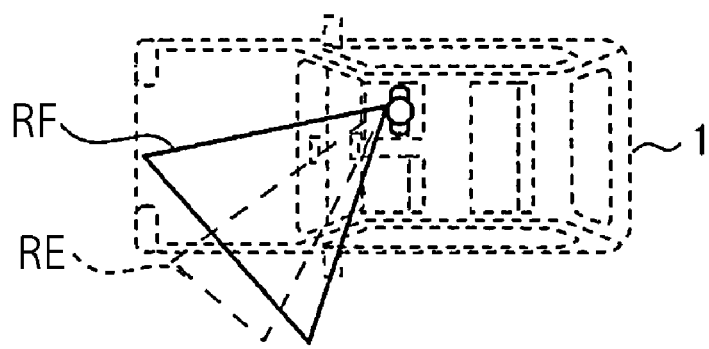
FIG. 9E is a plan view of an automobile for explaining distracted driving determination processing executed when the area including a face direction is found to be an FL area.

FIG. 9E is a plan view of the automobile 1 for explaining distracted driving determination processing executed when the area including the face direction is found to be the FL area 46.

In FIGS. 9A through 9E, a non-distracted-driving angle range RF in the face direction and a non-distracted-driving angle range RE in the eye direction are illustrated.

When the area including the face direction is found to be the FR area 42, the CPU 34 makes a determination on distracted driving of the driver only by using the face direction.

In this case, the CPU 34 makes a determination on distracted driving of the driver only based on the face-direction non-distracted-driving angle range RF indicated by the solid lines in FIG. 9A.

For example, the CPU 34 may determine whether the driver's attention is distracted by determining whether the face direction of the driver is included in the face-direction non-distracted-driving angle range RF illustrated in FIG. 9A.

If the face direction of the driver is not included in the face-direction non-distracted-driving angle range RF, the CPU 34 may determine that the driver's attention is distracted.

If the face direction of the driver is included in the face-direction non-distracted-driving angle range RF, the CPU 34 may determine that the driver's attention is not distracted.

In one example, the FR area 42 where distracted driving of a driver is determined only by using the face direction of the driver is provided as at least one of the multiple areas 42 through 46 obtained by dividing the driver viewing range in the left-right direction or the yaw direction of the automobile 1.

When the area including the face direction is found to be the FF area 43, the CPU 34 makes a determination on distracted driving of the driver by using both of the face direction and the eye direction.

In this case, the CPU 34 makes a determination on distracted driving of the driver based on the face-direction non-distracted-driving angle range RF and the eye-direction non-distracted-driving angle range RE indicated by the solid lines in FIG. 9B.

For example, the CPU 34 may determine whether the driver's attention is distracted by determining whether the face direction of the driver is included in the face-direction non-distracted-driving angle range RF illustrated in FIG. 9B and also by determining whether the eye direction of the driver is included in the eye-direction non-distracted-driving angle range RE illustrated in FIG. 9B.

If the face direction of the driver is included in the face-direction non-distracted-driving angle range RF and if the eye direction of the driver is included in the eye-direction non-distracted-driving angle range RE, the CPU 34 may determine that the driver's attention is not distracted.

If the above-described condition is not satisfied, the CPU 34 may determine that the driver's attention is distracted.

When the area including the face direction is found to be the FC area 44, the CPU 34 makes a determination on distracted driving of the driver only by using the face direction.

In this case, the CPU 34 makes a determination on distracted driving of the driver only based on the face-direction non-distracted-driving angle range RF indicated by the solid lines in FIG. 9C.

For example, the CPU 34 may determine whether the driver's attention is distracted by determining whether the face direction of the driver is included in the face-direction non-distracted-driving angle range RF illustrated in FIG. 9C.

If the face direction of the driver is not included in the face-direction non-distracted-driving angle range RF, the CPU 34 may determine that the driver's attention is distracted.

If the face direction of the driver is included in the face-direction non-distracted-driving angle range RF, the CPU 34 may determine that the driver's attention is not distracted.

In one example, the FC area 44 where distracted driving of a driver is determined only by using the face direction of the driver is provided as at least one of the multiple areas 42 through 46 obtained by dividing the driver viewing range in the left-right direction or the yaw direction of the automobile 1.

When the area including the face direction is found to be the FS area 45, the CPU 34 makes a determination on distracted driving of the driver by using both of the face direction and the eye direction.

In this case, the CPU 34 makes a determination on distracted driving of the driver based on the face-direction non-distracted-driving angle range RF and the eye-direction non-distracted-driving angle range RE indicated by the solid lines in FIG. 9D.

The face-direction non-distracted-driving angle range RF illustrated in FIG. 9D is located farther leftward than that illustrated in FIGS. 9A through 9C.

The eye-direction non-distracted-driving angle range RE illustrated in FIG. 9D is located farther leftward than that illustrated in FIGS. 9A through 9C.

For example, the CPU 34 may determine whether the driver's attention is distracted by determining whether the face direction of the driver is included in the face-direction non-distracted-driving angle range RF illustrated in FIG. 9D and also by determining whether the eye direction of the driver is included in the eye-direction non-distracted-driving angle range RE illustrated in FIG. 9D.

If the face direction of the driver is included in the face-direction non-distracted-driving angle range RF and if the eye direction of the driver is included in the eye-direction non-distracted-driving angle range RE, the CPU 34 may determine that the driver's attention is not distracted.

If the above-described condition is not satisfied, the CPU 34 may determine that the driver's attention is distracted.

When the area including the face direction is found to be the FL area 46, the CPU 34 makes a determination on distracted driving of the driver only by using the face direction.

In this case, the CPU 34 makes a determination on distracted driving of the driver only based on the face-direction non-distracted-driving angle range RF indicated by the solid lines in FIG. 9E.

For example, the CPU 34 may determine whether the driver's attention is distracted by determining whether the face direction of the driver is included in the face-direction non-distracted-driving angle range RF illustrated in FIG. 9E.

If the face direction of the driver is not included in the face-direction non-distracted-driving angle range RF, the CPU 34 may determine that the driver's attention is distracted.

If the face direction of the driver is included in the face-direction non-distracted-driving angle range RF, the CPU 34 may determine that the driver's attention is not distracted.

In one example, the FL area 46 where distracted driving of a driver is determined only by using the face direction of the driver is provided as at least one of the multiple areas 42 through 46 obtained by dividing the driver viewing range in the left-right direction or the yaw direction of the automobile 1.

As described above, for some areas (FF area 43 and FS area 45) of the multiple areas 41 through 48 obtained by dividing the driver viewing range, the CPU 34 makes a determination on distracted driving of a driver by using both of the face direction and the eye direction of the driver. For another area (B1 area 47) of the multiple areas 41 through 48, the CPU 34 makes a determination on distracted driving of a driver only by using the eye direction of the driver. For the remaining areas (U area 41, FR area 42, FC area 44, FL area 46, and B2 area 48) of the multiple areas 41 through 48, the CPU 34 makes a determination on distracted driving of a driver only by using the face direction of the driver. In one embodiment, the CPU 34 may serve as a "determiner".

As described above, in the embodiment, the driver viewing range where a driver of the automobile 1 may turn the face is divided into the multiple areas 41 through 48. An imaging device is able to capture an image indicating an occupant of the automobile 1. The CPU 34 makes a determination on distracted driving of the driver based on the image captured by the imaging device. From among the multiple areas 41 through 48, the CPU 34 determines the area including the face direction of the driver in the captured image and makes determination on distracted driving of the driver by executing determination processing differently in accordance with the determined area.

In this manner, distracted driving of a driver can be determined by executing determination processing differently in accordance with the determined area, based on the positional relationship between the determined area and the angle of the driver. In other words, the CPU 34 does not execute the same determination processing for the entire driver viewing range.

The state of the face or the eyes of a driver in a captured image is different in accordance with the angle of the driver. Hence, if the CPU 34 makes a determination on distracted driving of the driver by executing the same determination processing for the entire driver viewing range, the accuracy of distracted driving determination may become low depending on the angle of the driver. For example, if the CPU 34 executes the same distracted driving determination processing using both of the face direction and the eye direction of a driver and if an image of the eyeballs of the driver is taken in a state in which it is not possible to determine the eye direction, the CPU 34 fails to accurately determine the eye direction in the captured image and may make a wrong determination on distracted driving.

In contrast, in the embodiment, the driver viewing range where a driver may turn the face is divided into the multiple areas 41 through 48, and determination processing can be executed differently in accordance with the individual areas. The accuracy of distracted driving determination is thus enhanced and a wrong determination is less likely to occur.

While the embodiment has been discussed above, the disclosure is not restricted thereto. Various modifications and/or changes may be made without departing from the sprit and scope of the disclosure.

For example, in the above-described embodiment, in the control system 10 of the automobile 1, the CPU 34 of the driver/passenger monitoring unit 11 executes the entire processing illustrated in FIGS. 4 and 5.

In the control system 10, each of the UI unit 12, the driving support unit 13, the driving unit 14, the braking unit 15, and the steering unit 16 includes a CPU. The CPUs forming the control system 10 other than the CPU 34 may thus execute part of the processing illustrated in FIGS. 4 and 5. The CPUs of the control system 10 may collaboratively execute the processing illustrated in FIGS. 4 and 5 in a distributed manner.

In the above-described embodiment, the CPU 34 of the driver/passenger monitoring unit 11 determines the area including the face direction of the driver, from among the multiple areas 41 through 48 illustrated in FIG. 8.

The CPU 34 may determine the area including the face direction of the driver, from among the multiple areas illustrated in FIG. 6 or from among those illustrated in FIG. 7.

The CPU 34 may determine the area including the face direction of the driver from the front area and the peripheral area.

In the above-described embodiment, the CPU 34 of the driver/passenger monitoring unit 11 makes a determination on distracted driving of a driver of the automobile 1. The CPU 34 may also make a determination on distracted driving of a passenger in the automobile 1 other than the driver.

The control system 10 illustrated in FIG. 3 can be implemented by circuitry including at least one semiconductor integrated circuit such as at least one processor (e.g., a central processing unit (CPU)), at least one application specific integrated circuit (ASIC), and/or at least one field programmable gate array (FPGA). At least one processor can be configured, by reading instructions from at least one machine readable tangible medium, to perform all or a part of functions of the control system 10 including the driver/passenger monitoring unit 11, the UI unit 12, the driving support unit 13, the driving unit 14, the braking unit 15, and the steering unit 16. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the non-volatile memory may include a ROM and a NVRAM. The ASIC is an integrated circuit (IC) customized to perform, and the FPGA is an integrated circuit designed to be configured after manufacturing in order to perform, all or a part of the functions of the modules illustrated in FIG. 3.

The invention claimed is:

1. A distracted-driving monitoring apparatus for a vehicle, the distracted-driving monitoring apparatus comprising:
   an imaging device configured to capture an image of at least one occupant of the vehicle; and
   a determiner configured to make a determination on distracted driving of the occupant of the vehicle based on the captured image, wherein
   the determiner is configured to:
      identify areas in the captured image corresponding to areas that the occupant faces from among divided areas obtained by dividing a viewing range, the viewing range corresponding to a range where the occupant is likely to face while the vehicle is in operation;
   the determiner is configured to execute determination processing differently for each of the identified areas to make the determination on the distracted driving of the occupant,
   the determiner is further configured to:
      identify, from the captured image, an eye direction of the occupant and a face direction of the occupant;
      for a first area among the divided areas obtained by dividing the viewing range, make a determination on the distracted driving of the occupant by using both of the identified face direction and the identified eye direction;
      for a second area among the divided areas obtained by dividing the viewing range, make a determination on the distracted driving of the occupant not by using the identified face direction but by using the identified eye direction, the second area being different from the first area; and
      for a third area among the divided areas obtained by dividing the viewing range, make a determination on the distracted driving of the occupant not by using the identified eye direction but by using the identified face direction, the third area being other than the first and second areas.

2. The distracted-driving monitoring apparatus according to claim 1, wherein the divided areas obtained by dividing the viewing range are at least a front area and a peripheral area, the front area being an area in a traveling direction of the vehicle, the peripheral area being an area around the front area.

3. The distracted-driving monitoring apparatus according to claim 1, wherein the viewing range is divided into the divided areas in a pitch direction or a top-bottom direction of the vehicle, or the viewing range is divided into the divided areas in a yaw direction or a left-right direction of the vehicle.

4. The distracted-driving monitoring apparatus according to claim 1, wherein the third area is provided as at least one of areas obtained by dividing the viewing range in a left-right direction or a yaw direction of the vehicle.

5. The distracted-driving monitoring apparatus according to claim 4, wherein the third area is provided as at least one of areas obtained by dividing the viewing range in a top-bottom direction or a pitch direction of the vehicle.

6. The distracted-driving monitoring apparatus according to claim 1, wherein the third area is provided as at least one of areas obtained by dividing the viewing range in a top-bottom direction or a pitch direction of the vehicle.

7. A distracted-driving monitoring apparatus for a vehicle, the distracted-driving monitoring apparatus comprising:
   an imaging device configured to capture an image of at least one occupant of the vehicle; and
   circuitry configured to:
      make a determination on distracted driving of the occupant of the vehicle based on the captured image,
      identify areas in the captured image corresponding to areas that the occupant faces from among areas obtained by dividing a viewing range, the viewing range corresponding to a range where the occupant is likely to face while the vehicle is in operation; and
      execute determination processing differently for each of the identified areas to make the determination on the distracted driving of the occupant,
   wherein the circuitry is further configured to:
      identify, from the captured image, an eye direction of the occupant and a face direction of the occupant;
      for a first area among the divided areas obtained by dividing the viewing range, make a determination on the distracted driving of the occupant by using both of the identified face direction and the identified eye direction;
      for a second area among the divided areas obtained by dividing the viewing range, make a determination on the distracted driving of the occupant not by using the identified face direction but by using the identified eye direction, the second area being different from the first area; and
      for a third area among the divided areas obtained by dividing the viewing range, make a determination on the distracted driving of the occupant not by using the identified eye direction but by using the identified face direction, the third area being other than the first and second areas.

* * * * *